(12) United States Patent
Pennell et al.

(10) Patent No.: US 10,802,844 B2
(45) Date of Patent: Oct. 13, 2020

(54) DISTRIBUTED APPLICATION BASED OFF OF STATEFUL DESKTOP APPLICATION

(71) Applicant: Microsoft Technology Licensing, LLC, Redmond, WA (US)

(72) Inventors: Andrew Michael Pennell, Kirkland, WA (US); Irina Koulinitch, Seattle, WA (US); Olivier Colle, Bellevue, WA (US); Mariyan D. Fransazov, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 349 days.

(21) Appl. No.: 15/283,164

(22) Filed: Sep. 30, 2016

(65) Prior Publication Data

US 2017/0315823 A1 Nov. 2, 2017

Related U.S. Application Data

(60) Provisional application No. 62/329,101, filed on Apr. 28, 2016.

(51) Int. Cl.
 *G06F 9/451* (2018.01)
 *G06F 8/60* (2018.01)
 *G06F 40/14* (2020.01)

(52) U.S. Cl.
 CPC ............... *G06F 9/452* (2018.02); *G06F 8/60* (2013.01); *G06F 40/14* (2020.01)

(58) Field of Classification Search
 None
 See application file for complete search history.

(56) References Cited

U.S. PATENT DOCUMENTS 5,893,077 A 4/1999 Griffin
6,009,543 A * 12/1999 Shavit ...................... G06F 8/30
 712/200

(Continued)

FOREIGN PATENT DOCUMENTS

CN 102446221 A 5/2012
CN 102810069 A 12/2012

OTHER PUBLICATIONS

Mendonca, "Architectural Options for Cloud Migration," Aug. 1, 2014.

(Continued)

*Primary Examiner* — Cesar B Paula
*Assistant Examiner* — John M Heffington
(74) *Attorney, Agent, or Firm* — Workman Nydegger

(57) ABSTRACT

An architectural software model in which browser-executable code and non-browser executable code of an application are distributed. The browser-executable code (such as markup language and script) is executed by a browser on perhaps a client machine, whilst the non-browser executable code (such as C# code as an example) is executed on a server or by a service. Such code typically is included within a single desktop application with an interoperability component operating between. The browser-executable code is able to communicate with the non-browser executable code using a request-response protocol. In order to facilitate communication with the non-browser-executable code, the non-browser executable code is provided in an environment that includes a request translator and a response translator. The environment includes an interface which honors the request/response protocol followed by the browser-executable code.

20 Claims, 5 Drawing Sheets

(56) References Cited

U.S. PATENT DOCUMENTS

| | | | |
|---|---|---|---|
| 6,356,946 | B1 | 3/2002 | Clegg et al. |
| 7,296,022 | B2 | 11/2007 | Harjanto |
| 7,409,693 | B2 | 8/2008 | McCain et al. |
| 8,156,085 | B2 | 4/2012 | Dominguez et al. |
| 9,195,527 | B2 | 11/2015 | Malladi et al. |
| 9,223,599 | B1 | 12/2015 | Racanelli et al. |
| 2007/0263650 | A1 | 11/2007 | Subramania et al. |
| 2008/0162552 | A1 | 7/2008 | Bonev et al. |
| 2011/0209007 | A1 | 8/2011 | Feng et al. |
| 2011/0289141 | A1 | 11/2011 | Pletter et al. |
| 2014/0053085 | A1* | 2/2014 | Stephure ............. H04L 41/0253 715/753 |
| 2017/0228467 | A1* | 8/2017 | Bailly ............... G06F 17/30905 |

OTHER PUBLICATIONS

"International Search Report and the Written Opinion" issued in PCT Application PCT/US2017/029515 dated Aug. 16, 2017.
"Jolokia Protocol", Published on: Oct. 24, 2010 Available at: https://jolokia.org/reference/html/protocol.html.
Reiss, Bill, "Making JSON Web Requests easier with async and await", Published on: Jan. 10, 2013 Available at: http://billreiss.com/making-json-web-requests-easier-with-async-and-await/.

* cited by examiner

DISTRIBUTED APPLICATION BASED OFF OF STATEFUL DESKTOP APPLICATION

CROSS-REFERENCE TO RELATED APPLICATION

This application claims the benefit of U.S. Provisional Patent Application Ser. No. 62/329,101, filed Apr. 28, 2016, which provisional patent application is incorporated herein by reference in its entirety.

BACKGROUND

A typical desktop application that interacts with the web includes browser-executable code and non-browser-executable code. A quintessential example of browser-executable code is markup language such as HyperText Markup Language (HTML). Styling code may also be executed by a browser, such as Cascading Style Sheets (CS S). With the presence of an appropriate supporting runtime, browsers may also execute script-based languages such as Javascript and Typescript. The browser-executable code typically operates more of the user-interface facing functions.

Non-browser executable code is code that cannot be executed by the browser itself. Such code includes code that is compiled from conventional programming languages such as C, C++ or C#, which is executed by the operating system without the use of the browser. Typically, an operating system provides an interoperability component that allows browser-executable code and non-browser-executable code. The non-browser-executable code typically operates more of the underlying non-user-interface facing functions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to an architectural software model in which browser-executable code and non-browser executable code of an application are distributed. The browser-executable code (such as markup language and script) is executed by a browser on perhaps a client machine, whilst the non-browser executable code (such as C# code as an example) is executed on a server or by a service. Such code typically is included within a single desktop application with an interoperability component operating between.

In accordance with the principles described herein, the browser-executable code is able to communicate with the non-browser executable code using a request-response protocol even though the non-browser executable code itself is not equipped to directly handle such requests, or generate corresponding responses, or perhaps even follow any request/response type protocol at all. Request/response protocols are common for communicating across the Internet.

In order to facilitate communication with the non-browser-executable code, the non-browser executable code is provided in an environment that includes a request translator and a response translator. The environment includes an interface which honors the request/response protocol followed by the browser-executable code.

The request translator takes incoming requests from the browser-executable code via an interface, translates each of at least some of the incoming requests into a format recognized by the non-browser-executable code, provides the translated requests to the non-browser-executable code. In order to scale, the request translator may also make sure that that the translated request is routed to the appropriate instance of the non-browser-executable code.

The response translator takes outgoing non-request/response protocol interactions from the non-browser executable code and translates at least part of the interactions into a response for providing back to the browser-executable code via the interface. Again, in order to scale, the response translator may also make sure that the translated response is routed to the appropriate instance of the browser-executable code. The response may be a complex response that includes an object in that includes one or more executable instructions for the browser to execute, such as modify the user interface, or connect a user interface component with an appropriate data input source or data output target.

This model allows for an application author to draft browser-executable code and/or non-browser executable code in the same way regardless of whether the code will be implemented in a desktop application or in a distributed application. Furthermore, this model allows for the automated or simplified distribution of a currently existing desktop application since the browser-executable code and the non-browser-executable code.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to an architectural software model in which browser-executable code and non-browser executable code of an application are distributed. The browser-executable code (such as markup language and script) is executed by a browser on perhaps a client machine, whilst the non-browser executable code (such as C# code as an example) is executed on a server or by a service. Such code typically is included within a single desktop application with an interoperability component operating between.

In accordance with the principles described herein, the browser-executable code is able to communicate with the non-browser executable code using a request-response protocol even though the non-browser executable code itself is not equipped to directly handle such requests, or generate corresponding responses, or perhaps even follow any request/response type protocol at all. Request/response protocols are common for communicating across the Internet.

In order to facilitate communication with the non-browser-executable code, the non-browser executable code is provided in an environment that includes a request translator and a response translator. The environment includes an interface which honors the request/response protocol followed by the browser-executable code.

The request translator takes incoming requests from the browser-executable code via an interface, translates each of at least some of the incoming requests into a format recognized by the non-browser-executable code, provides the translated requests to the non-browser-executable code. In order to scale, the request translator may also make sure that that the translated request is routed to the appropriate instance of the non-browser-executable code.

The response translator takes outgoing non-request/response protocol interactions from the non-browser executable code and translates at least part of the interactions into a response for providing back to the browser-executable code via the interface. Again, in order to scale, the response translator may also make sure that the translated response is routed to the appropriate instance of the browser-executable code. The response may be a complex response that includes an object in that includes one or more executable instructions for the browser to execute, such as modify the user interface, or connect a user interface component with an appropriate data input source or data output target.

This model allows for an application author to draft browser-executable code and/or non-browser executable code in the same way regardless of whether the code will be implemented in a desktop application or in a distributed application. Furthermore, this model allows for the automated or simplified distribution of a currently existing desktop application since the browser-executable code and the non-browser-executable code.

Figure 1:
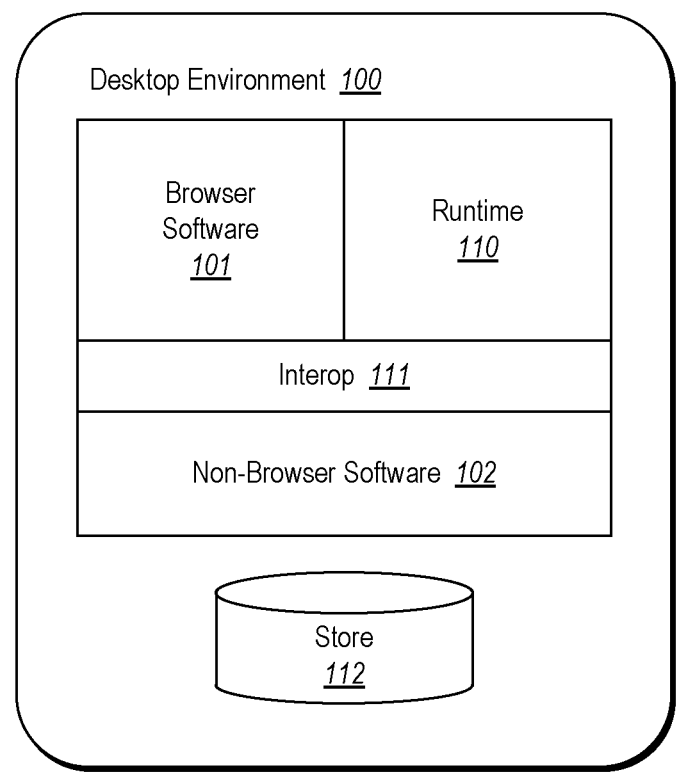
FIG. 1 schematically illustrates a desktop application that includes browser-executable code and non-browser-executable code that communicates with each other using an interoperability component, and in which script of the browser-executable code may be run with the assistance of a runtime.

As depicted in FIG. 1, a desktop application is executed in a desktop environment 100. Desktop applications often include software 101 that is executable by a browser (hereinafter, "browser-executable code" or "browser software") and software 102 that is not executable by a browser (hereinafter, "non-browser-executable code" or "non-browser software"). FIG. 1 illustrates an example prior art desktop environment 100.

Examples of the browser executable software 101 might include HyperText Markup Language (HTML), Javascript (JS), or Typescript (TS). A runtime 110 typically assists the browser with execution of Javascript and Typescript. Examples of non-browser executable software 102 includes, for instance, C#. The desktop environment 100 also includes stores 112 that may be used by the desktop application to maintain state. In one example, the browser executable software 101 is used to present a user interface, whereas the non-browser software is a stateful application that maintains state using stores 112.

An interoperability component 111 facilitates communication between the browser-executable software 101 and the non-browser executable software. An example of an interoperability component 111 that facilitates communication between C# software and browser-executable software is the WINDOWS runtime. However, other operating systems also have interoperability components to allow browser-executable software to communicate with non-browser executable software.

In accordance with some embodiments described herein, the stateful application embodied with this non-browser executable software 102 is a transformation chain. As such, the principles described herein may operate using a transformation chain or graph (which terms are used interchangeably herein). A transformation chain is an interconnected set of nodes that each may represent data sources or data targets.

There are links between the nodes, each link representing a transformation. For any given link, the associated transformation receives copies of values of one or more data sources situated at an input end to the link, and generates resulting values being provided at one or more data targets located at the output end of the link. For any given transformation, when a value at one or more of the data sources at its input end changes, the transformation is automatically reevaluated, potentially resulting in changes in value(s) of one or more data targets at the output end of the transformation. The role of nodes and links may of course reverse, with nodes representing data flows, and links representing transformations.

In one embodiment, regardless of how complex the transformation chain is, the transformations may be constructed from declarative statements expressing equations, rules, constraints, simulations, or any other transformation type that may receive one or more values as input and provide the resulting one or more values as output. Transformation chains may be augmented as a program is built by linking different transformation chains to honor the dependencies between the chains. Portions of transformation chains may also be delegated to other devices and/or users. Nodes of the transformation graph may encapsulate specific data included within a given data set/data table (e.g., data included within a data field of a data table), which data may be visualized in a generated application, as described herein.

Because the principles described herein operate in the context of a computing system and a transformation chain, a computing system with respect to FIG. 2 will first be described as enabling technologies for the principles described herein. Thereafter, further details regarding the distributing of browser and non-browser-executable code will be described with respect to FIGS. 2 through 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 2:
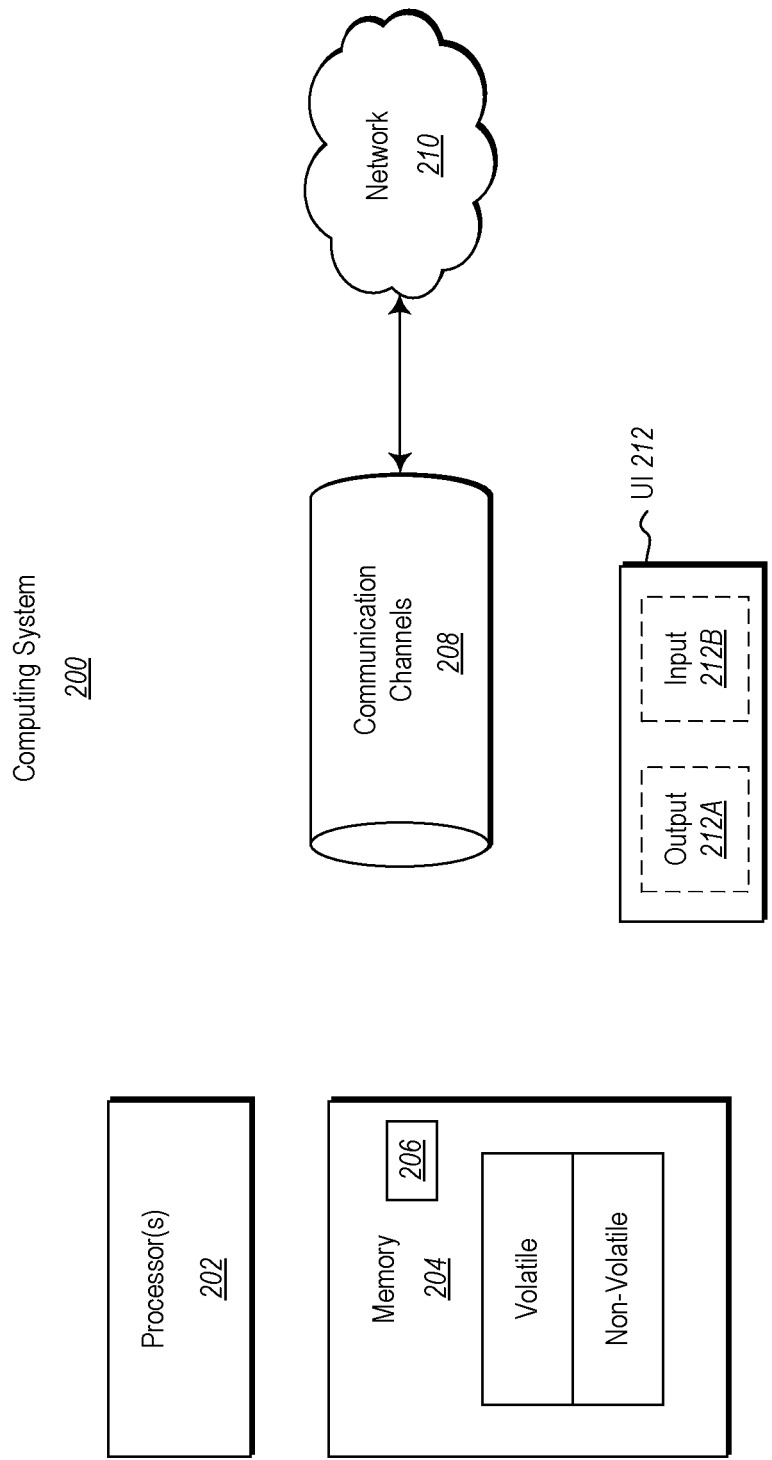
FIG. 2 illustrates a computing system in which the principles described herein may operate, and which may operate a browser as described herein or a server or service as described herein.

As illustrated in FIG. 2, in its most basic configuration, a computing system 100 typically includes at least one hardware processing unit 202 and memory 204. The memory 204 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 200 also has thereon multiple structures often referred to as an "executable component". For instance, the memory 204 of the computing system 200 is illustrated as including executable component 206. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine", "scheduler", "manager", "module", "compiler", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 204 of the computing system 200. Computing system 200 may also contain communication channels 208 that allow the computing system 200 to communicate with other computing systems over, for example, network 210.

While not all computing systems require a user interface, in some embodiments, the computing system 200 includes a user interface 212 for use in interfacing with a user. The user interface 212 may include output mechanisms 212A as well as input mechanisms 212B. The principles described herein are not limited to the precise output mechanisms 212A or input mechanisms 212B as such will depend on the nature of the device. However, output mechanisms 212A might include, for instance, speakers, displays, projectors, tactile output, valves, actuators, holograms, virtual reality, and so forth. Examples of input mechanisms 212B might include, for instance, microphones, touchscreens, holograms, virtual reality controls, cameras, keyboards, accelerometers, levers, pedals, buttons, knobs, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 3:
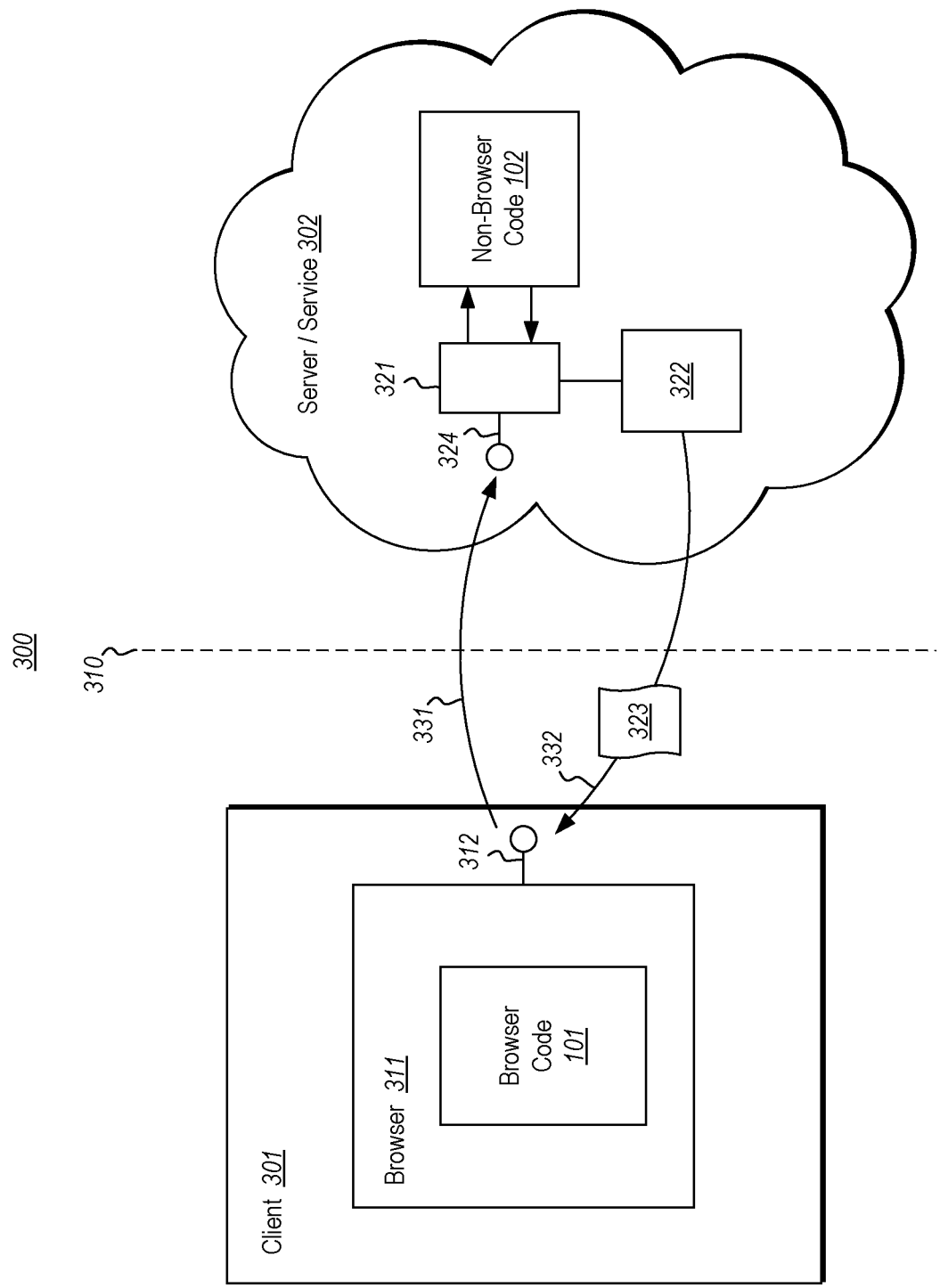
FIG. 3 illustrates a distributed environment 300 in which an application may be run and in which browser-executable code runs on a browser, and non-browser-executable code runs remotely.

FIG. 3 illustrates an environment 300 in which an application may be run. The application includes two distributed pieces including the browser executable code 101 and the non-browser executable code 102. However, rather than having both pieces of software 101 and 102 in a desktop environment 100, as is the case for FIG. 1, the software 101 and 102 is now distributed. The browser executable software 101 remains executed on a client 301 via executable by a browser 101 similar to the situation of FIG. 1. An example of a client 301 is the computing system 201 of FIG. 1. However, unlike FIG. 1, the non-browser executable code 102 is now running remotely from the client 301. For instance, the non-browser executable software 102 is shown as operating within a server 302 or a service 302. As an example, the service 302 may be operating with a cloud computing environment.

The browser-executable code 101 of FIG. 3 may be substantially similar to, if not identical to, the browser-executable software 101 of FIG. 1. Likewise, the non-browser executable code 102 of FIG. 3 may be substantially similar to, if not identical to, the non-browser executable software 102 of FIG. 2. Accordingly, the distributed version of the application (constituting the combination of software 101 and 102) may be deployed as shown in FIG. 3 with minimal, if any, rewriting of the application itself.

This distributed version of the application may even be constructed using the desktop application as input, extracting the software 101 and 102 therefrom, and automatically constructing the remaining component shown in FIG. 3 that will further be described. In addition, an application author or coder may author an application without regard for whether it will be deployed in a desktop environment (in which browser-executable code and non-browser executable code may freely communicate) or whether they will be remotely deployed (in which case they have not previously been able to freely communicate—but may, in accordance with the principles described herein.)

The browser-executable code 101 may be executed within the browser 311, just as in FIG. 1. The browser renders user interface element on the display of the computing system. For instance, if the client 301 were a computing system 100 such as that described with respect to FIG. 1, the browser may render user interface elements on an output mechanism 112A, and may detect input with respect to user interface controls issued by users with respect to an input mechanism 112B. From the user's perspective, the experience of FIG. 3 may thus be quite similar to the experience of interfacing directly with a locally executing desktop application as in the case of FIG. 1.

The service 302 exposes an application program interface 324. A corresponding communicator 312 of the client browser 311 may issue requests (as represented by arrow 331) using the application program interface 324. Given that the protocol is a request/response protocol, the service 302 would then construct an appropriate response using the application program interface recognized by the communicator 312 of the client browser 311. As an example, the application program interface recognized by the communicator 312 and the service 302 may be a REST API (such as an HTTP request/response pattern). However, the protocol may be any protocol that allows inter-process communication.

In order to generate an appropriate response, a request translator 321 first takes the incoming request and translates it into an appropriate corresponding request that conforms to an API that is recognized by the non-browser executable software 102. In order to ensure that sessions are enabled, the request translator 321 also ensures that the request is passed on to an appropriate instance of the non-browser executable software 102. The non-browser executable software maintains state, and thus takes the request, processes it potentially changing the state of the instance of the non-browser executable software 102, and then returns an appropriate response.

Previously, the communication between the non-browser executable software 102 and the browser-executable software 101 may be quite intricate. However, now that communication is reduced to a request/response protocol. In order to accommodate complex communication with such a limited pattern, a complex response translator 322 generates a complex response with a series of instructions. Such instructions could be communicated in an object included within the response, where the object is interpretable by the browser-executable software 101. As an example, the instructions may be serialized within a JSON object.

Such instructions could include an instruction to call back to the service with some piece of information only the client 301 knows. Alternatively or in addition, the instructions might include instructions to change the user interface should certain events occur. For instance, if the user added a gallery control, and specifies that an image of the gallery is to be populated by the output of a camera that is present on the client 301, the instructions might be for the browser executable code to late-bind the output from that camera into the presently blank field of the gallery control IF the camera is used to take a picture. In essence, the instructions could anticipate one of a limited number of predetermined events that could happen, and then instruct the browser-executable code on what to do if those events occurred.

Thus, the principles described herein provide an effectively mechanism to allow existing desktop applications to be distributed between the client and the cloud, where the non-browser executable code is executed on the cloud. Furthermore, such applications may be stateful as the non-browser executable code maintains the state in the cloud. Furthermore, sessions are enabled via checks at a controller within the service, to be sure that the correct instance of non-browser executable software is communicated with. Thus, the correct state and application are matched to the correct user, enabling this concept to scale across potentially very many different desktop applications and many different users. Finally, complex instructions may be communicated in the response to each request, allowing for the client to issue further request, or perform other actions, as instructed by the non-browser executable software.

Figure 4:
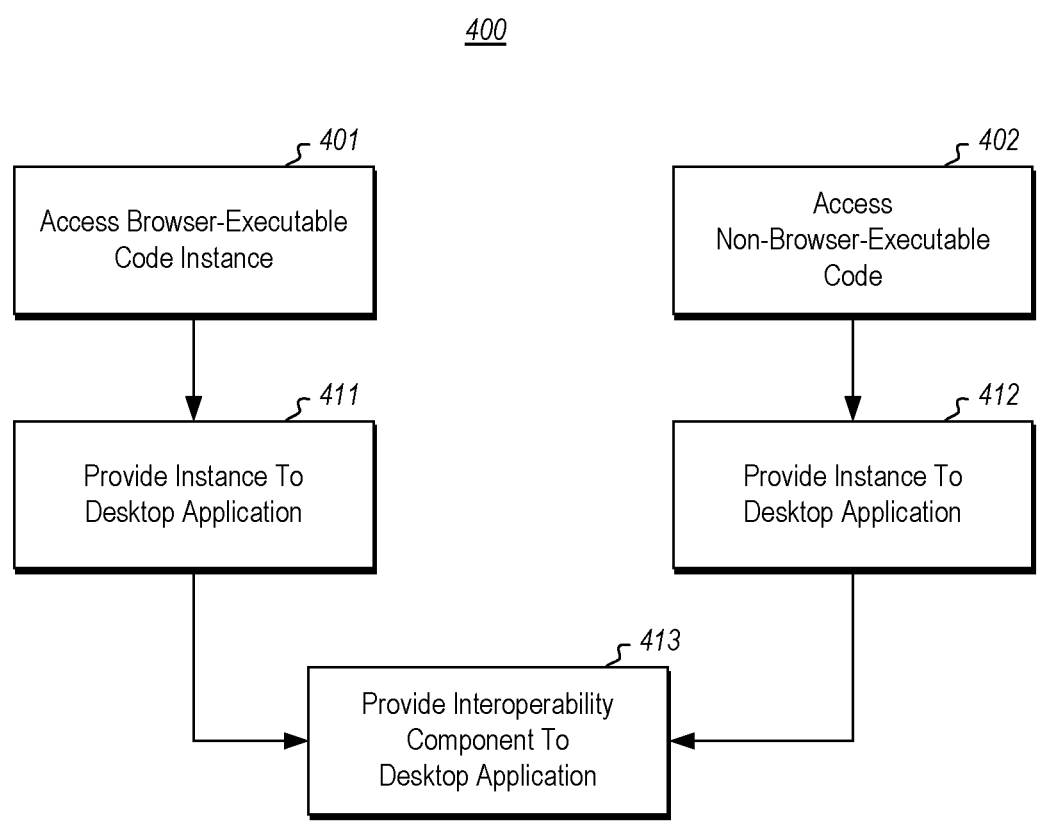
FIG. 4 illustrates a flowchart of a method for creating a desktop application.
Figure 5:
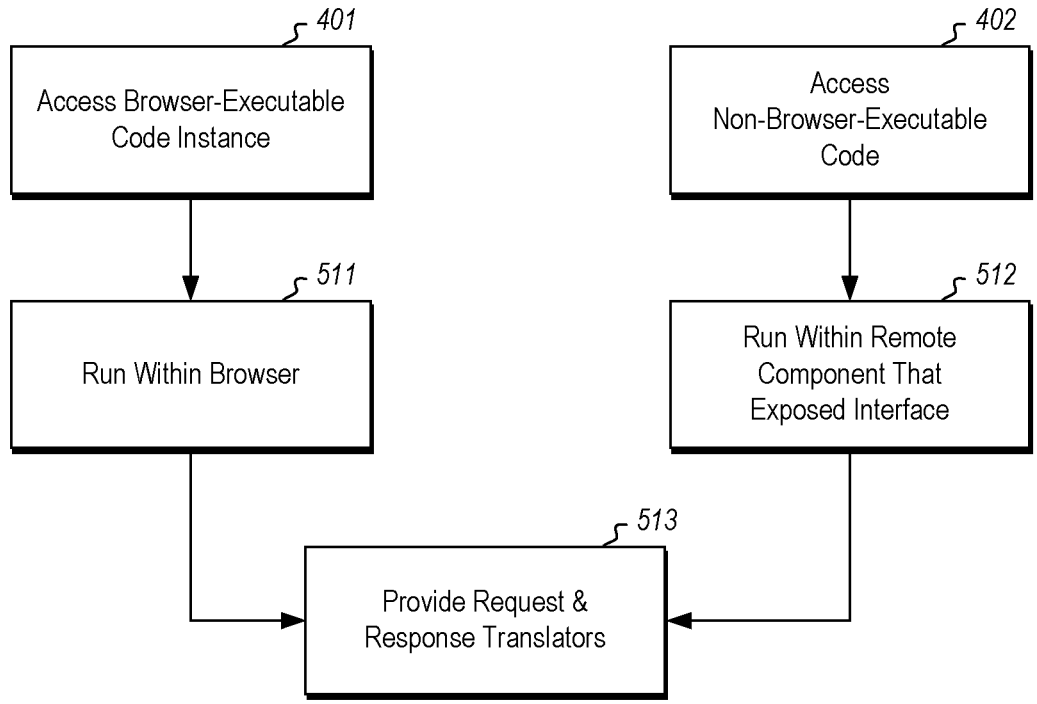
FIG. 5 illustrates a flowchart of a method for creating a distributed application in accordance with the principles described herein.

As previously mentioned, the principles described herein allow for authoring of browser-executable code and non-browser executable code without regard for whether such will be included within an integrated desktop application or regardless of whether the code will be distributed between a browser and a remote service. FIG. 4 thus illustrates a flowchart of a method 400 for creating a desktop application. FIG. 5 illustrates a flowchart of a method 500 for creating a distributed application. Each method 400 and 500 begins with the same acts of accessing an instance of browser-executable code that is executable by a browser (act 401) and accessing an instance of non-browser-executable code that is not-executable by a browser (act 402).

In accordance with the method 400, the desktop application is formulated by providing (act 411) the desktop application with the instance of the browser-executable code and the instance of the non-browser executable code, and providing the desktop application with an interoperability component (412) that allows the second instance of the browser-executable code and the second instance of the non-browser executable code to communicate. Thus, the desktop application is created.

In accordance with the method 500, the distributed application is formulated by running the browser-executable code within a browser (act 511) that communicates using a request-response protocol. The instance of the non-browser executable code is run remotely within a component that exposes an interface that recognize the request-response protocol of the browser (act 512). Thus, the interface is used to receive requests from the browser-executable code and provides corresponding responses to the browser-executable code after processing by the non-browser-executable code. Furthermore, a request translator and a response translator are provided (act 513) to the remotely running component.

Figure 6:
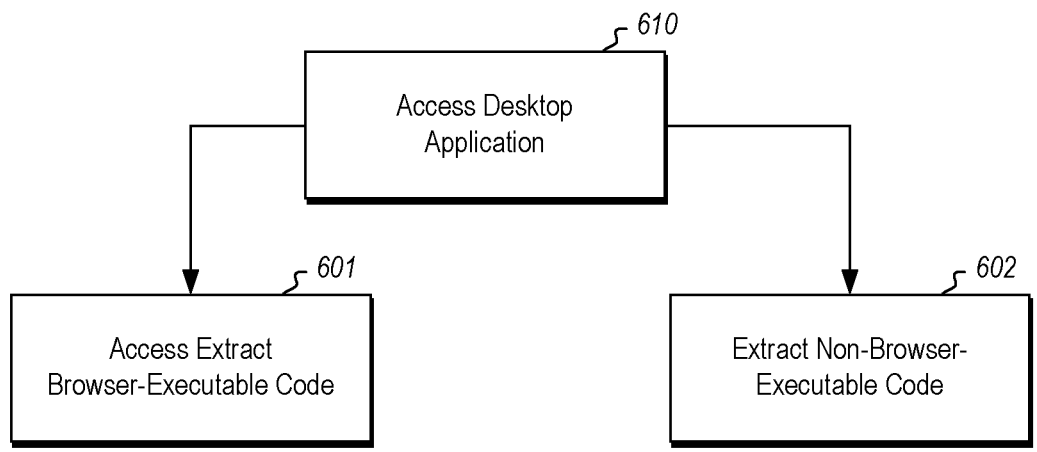
FIG. 6 illustrates a flowchart of a method for automatically initiating creating the distributed application using the desktop application as input and which may be continued using the method of FIG. 5.

Furthermore, as previously described, the distributed application may be automatically created from the desktop application. FIG. 6 illustrates a flowchart of a method 600 for automatically initiating creating the distributed application using the desktop application as input. First, the desktop application is accessed (act 610). Then the browser-executable code is extracted (act 601) from the desktop application, and the non-browser-executable code is extracted (act 602) from the desktop application. This may be automatically performed by recognition of the format (e.g., HTML, javascript, c# and so forth), and identifying whether the code is browser-executable or non-browser executable based on the type of file. Because acts 601 and 602 may represent examples of how the code is accessed in acts 501 and 502 respectively, and because the method 500 may be automatically performed, a distributed application may be automatically constructed from a desktop application.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing system comprising:
one or more processors;
one or more computer-readable media having thereon computer-executable instructions that are structured such that, when executed by the one or more processors, the computing system is caused to distribute a desktop application so that browser-executable code of the desktop application is executable by a browser of a local computer system, and non-browser-executable code is executed by a remote system in communication with the browser, including causing the computing system to at least:
access executable code defining a desktop application that was not developed for remote or distributed deployment, wherein the executable code defining the desktop application comprises both browser-executable code that is executable by a browser, and non-browser-executable code that is not executable by the browser;
extract the executable code defining the desktop application into a first portion comprising the browser-executable code and a second portion comprising the non-browser-executable code, wherein the second portion lacks native functionality allowing it to directly receive requests from or directly provide responses to the first portion, and wherein, based on the extraction, the first portion and the second portion are independently executable;
automatically construct a service, separate from the first portion and the second portion, that is configured to allow the first portion and the second portion to communicate using a browser based request-response protocol;
distribute the application between the local computer system and the remote system, such that the first portion comprising only the browser-executable code is provided at the local computer for execution by the browser at the local computer system and the second portion comprising only the non-browser-executable code is provided to the remote system for execution by the remote system;
cause the first portion to execute within a browser at the local computer system;
cause the second portion to execute at the remote system;
receive a request that has been generated from the first portion and cause the service that recognizes the browser based request-response protocol, and that is used to receive requests from the first portion, to execute and translate the received request into a protocol that is different than the browser based request-response protocol for processing by the second portion; and
provide a corresponding response from the second portion to the first portion after processing by the second portion and after the response from the second portion has been translated into the browser based request-response protocol.

2. The computing system in accordance with claim 1, the response comprising an object that includes one or more instructions for the browser-executable code to perform.

3. The computing system in accordance with claim 2, the one or more instructions comprising a call-back instruction for the browser-executable code to issue a request back to the interface with more information.

4. The computing system in accordance with claim 2, the one or more instructions comprising a call-back instruction for the browser-executable code to issue a request back to the interface upon the occurrence of one or more conditions.

5. The computing system in accordance with claim 2, the one or more instructions comprising an instruction to change the user interface rendered by the browser should one or more conditions occur.

6. The computing system in accordance with claim 5, the changing of the user interface comprising coupling of a user interface component with a data source so that the user interface component renders data from the data source.

7. The computing system in accordance with claim 5, the changing of the user interface comprising coupling of a user interface control component with a data target so that user manipulation of the user interface control component causes data to flow to a data target.

8. The computing system in accordance with claim 1, the interface serving multiple instances of the non-browser-executable code and multiple sessions with browser-executable code, the request translator further causing each translated request to be forwarded to a matching instance of the non-browser-executable code.

9. The computing system in accordance claim 1, the recognized interface being an inter-process communication protocol.

10. The computing system in accordance with claim 1, the non-browser-executable code being a stateful application.

11. The computing system in accordance with claim 10, the stateful application comprising a transformation chain comprising an interconnected set of nodes that each represent a data sources and/or a data target and with each link between the nodes representing one or more data flows.

12. The computing system in accordance with claim 10, the stateful application comprising a transformation chain comprising an interconnected set of nodes that each represent data flows and with each link between the nodes representing a data source and/or a data target.

13. A method for distributing a desktop application so that browser-executable code of the desktop application is executable by a browser of a local computer system, and non-browser-executable code is executed by a remote system in communication with the browser, the method comprising:
accessing executable code defining a desktop application that was not developed for remote or distributed deployment, the executable code comprising both browser-executable code that is executable by a browser, and non-browser-executable code that is not executable by the browser;
separating the executable code into a first portion defining the desktop application and comprising only the browser-executable code and a second portion comprising only the non-browser executable code, the second portion lacks native functionality allowing it to directly receive requests from or directly provide responses to the first portion, and wherein based on the separation, the first portion and the second portion are independently executable;
automatically constructing a service, separate from the first portion and the second portion, that is configured to allow the first portion and the second portion to communicate using a browser based request-response protocol;
distribute the application between the local computer system and the remote system, such that the first portion comprising only the browser-executable code is provided at the local computer for execution by the browser at the local computer system and the second portion comprising only the non-browser-executable code is provided to the remote system for execution by the remote system;

causing the first portion to execute within a browser at the local computer system;

causing the second portion to execute at the remote system;

receiving a request that has been generated from the first portion and causing the service that recognizes the browser based request-response protocol, and that is used to receive requests from the first portion to execute and translate the received request into a protocol that is different than the browser based request-response protocol for processing by the second portion; and providing one or more corresponding responses from the second portion to the first portion after processing by the second portion and after the response from the second portion has been translated into the browser based request-response protocol.

14. The method in accordance with claim 13, the method being performed automatically upon accessing the desktop application.

15. A method for independently utilizing separate portions of executable code that defines a desktop application that was not developed for distributed deployment, as a desktop application and as a service, the method comprising:

accessing a first portion of the executable code that defines the desktop application that was not developed for distributed deployment, the first portion comprising browser-executable code that is executable by a browser;

accessing a second portion of executable code that defines the desktop application that was not developed for distributed deployment, the second portion comprising non-browser-executable code that is not-executable by the browser;

automatically constructing a service, separate from the first portion and the second portion, that is configured to allow the first portion and the second portion to communicate using a recognized browser based request-response protocol;

distributing the application between the local computer system and the remote system, such that the first portion comprising only the browser-executable code is provided at the local computer for execution by the browser at the local computer system and the second portion comprising only the non-browser-executable code is provided to the remote system for execution by the remote system;

causing the first portion to execute within a browser at a first computer system;

causing the second portion to execute at a second computing system that is remote from the first computing system;

receiving a request that has been generated from the first portion and causing the service that recognizes the browser based request-response protocol, and that is used to receive requests from the first portion and provides corresponding responses to the first portion after processing by the second portion; and providing one or more corresponding responses from the second portion to the first portion after processing by the second portion and after the one or more corresponding responses are translated into the browser based request-response protocol.

16. The method in accordance with claim 15, the first portion comprising the browser-executable code being a first instance of the first portion, the second portion comprising non-browser executable code being a first instance of the second portion, the method further comprising constructing a desktop application using the first portion and the second portion performing the following:

formulating a new desktop application by providing the new desktop application with a second instance of the first portion and a second instance of the second portion, and providing the new desktop application with an interoperability component that allows the second instance of the first portion and the second instance of the second portion to communicate.

17. The method in accordance with claim 15, the response comprising an object that includes one or more instructions for the browser-executable code to perform.

18. The method in accordance with claim 15, the interface serving multiple instances of the second portion and multiple sessions with the first portion, the request translator further causing each translated request to be forwarded to a matching instance of the second portion.

19. The method in accordance claim 15, the recognized interface being an inter-process communication protocol.

20. The method in accordance with claim 15, the second portion being a stateful application.

* * * * *